Figure 1:
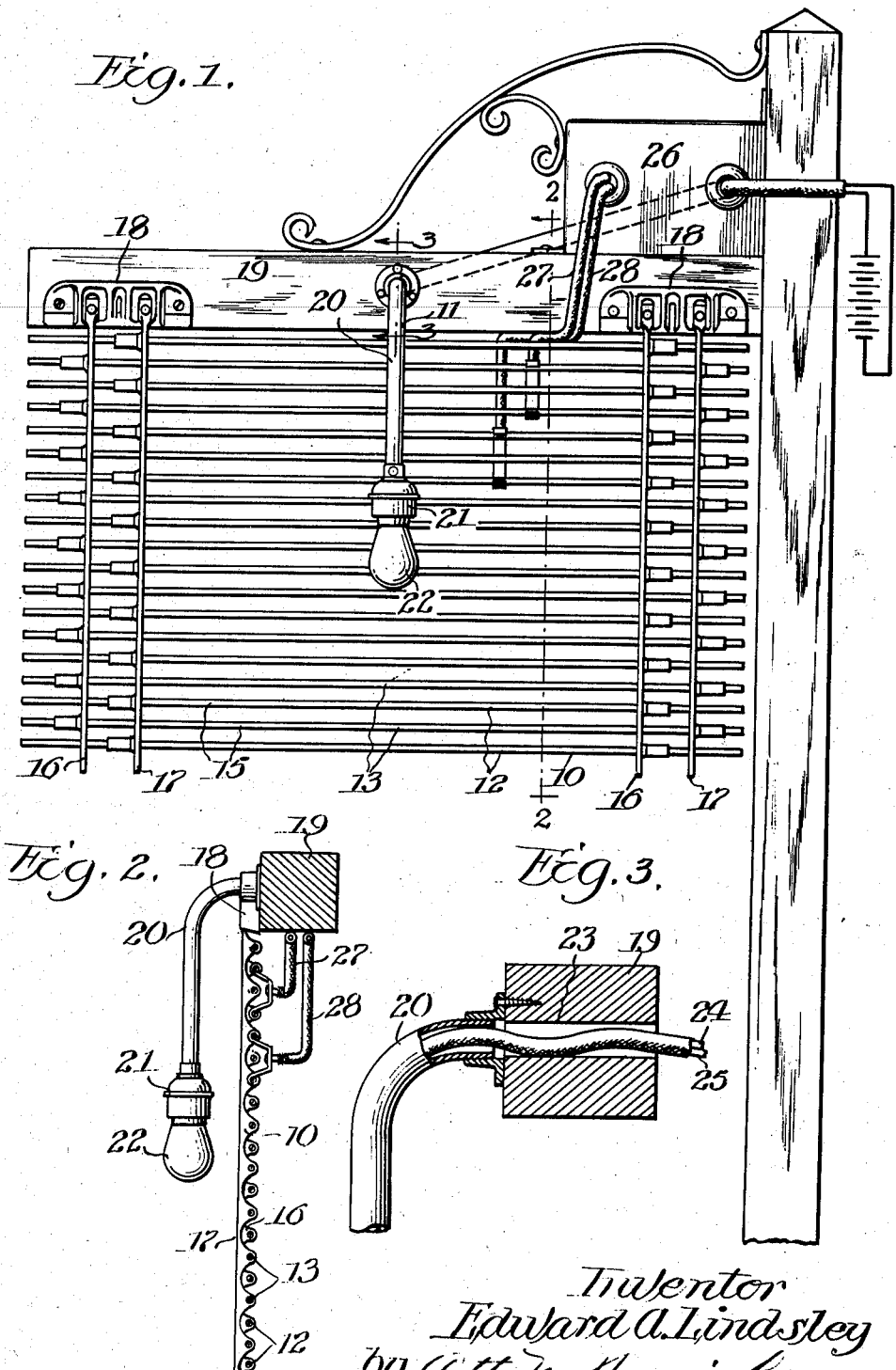

May 23, 1939. E. A. LINDSLEY 2,159,618
ELECTROCUTING TRAP
Filed March 15, 1937

Inventor
Edward A. Lindsley
by Otto M. Wernich atty.

Patented May 23, 1939

2,159,618

UNITED STATES PATENT OFFICE 2,159,618

ELECTROCUTING TRAP

Edward A. Lindsley, Chicago, Ill., assignor to National Electric Screen Co., Chicago, Ill., a corporation of Illinois Application March 15, 1937, Serial No. 130,808

2 Claims. (Cl. 43—112)

The invention relates to insect electrocuting devices involving the use of an electrocuting device and a lure, the device being particularly designed to entice insects having night-flying phototropic tendencies or characteristics.

The invention has, among its various objects, the provision of a structure capable of causing electrocution of insets during their travel, either toward or away from the lure.

The invention has, as an additional object, the provision of a construction embodying elements such as above described, in which said elements are arranged with respect to each other to induce insects to exercise their natural tendencies of flight toward a light, or encircling a light, or upon flying away from the light, to be brought into effective relation with the grid to accomplish their electrocution.

The invention also contemplates arranging a lure, such as a light, relatively to the grid, so that the most effective intensity of the light rays emanating from the light are substantially retained within the area of the grid, to thus cause the insects to concentrate at the grid and be brought into effect with the grid.

In addition to the above, it is an object of the invention to arrange the lure in a manner to provide the approximate center of orbits of travel described in flight of an insect about the lure, after flight into the vicinity of the lure, and to arrange the electrocuting grid with respect to the lure to accomplish electrocution.

It is also an object of the invention to provide a construction capable of functioning to accomplish electrocution of insects approaching the lure from either side of the grid, and to employ a grid having a dimension substantially equivalent to a relatively large orbital diameter of flight of insects, since the orbits of flight vary considerably in contour and diameter and are greatly influenced by the intensity of the light, the location of the center of orbital flight may vary considerably from the point or location of the lure.

A further object of the invention is to provide an electrocuting device in which the grid is proportional in size to the intensity of the light or lure and to thereby provide a range of light intensity as great as possible for the amount of material used, to thereby cause insects to be brought within the area of the grid, as it is possible to provide a lure having an intensity so great as to repel insects and reduce the killing area and the effectiveness of the device.

The invention also has, as one of its prime objects, an arrangement whereby a substantially flat grid, slightly curved or having portions which are at a slight angle to each other, such as now commonly manufactured and employed to screen an opening in a door or window, may merely, by the addition of a light, be transformed to provide means for electrocuting night-flying insects without requiring a special design of grid to accomplish this last-named advantage, which thus simplifies manufacture and reduces manufacturing and selling costs.

The invention has these and other objects, all of which will be explained in detail and more readily understood when read in conjunction with the accompanying drawing, which illustrates one embodiment of which the invention is susceptible, it being understood that changes and modifications may be resorted to without departing from the spirit of the appended claims forming a part hereof.

Figure 2:
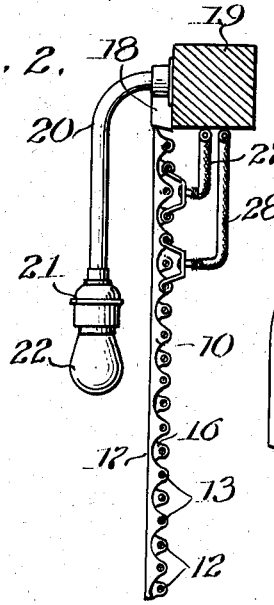
Figure 3:
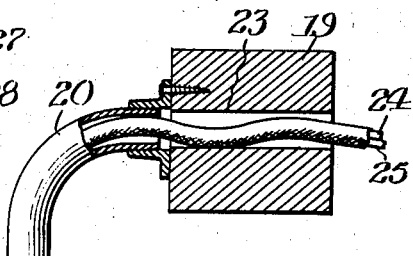

In the drawing, Fig. 1 is a front elevation of a structure embodying the invention showing the device mounted for use upon a post; Fig. 2 is a sectional view taken on line 2—2 of Fig. 1; and Fig. 3 is a detail sectional view taken on line 3—3 of Fig. 1.

It is known that many different insects are enticed by a light or lure of any density, and this enticement is increased as the light intensity or lure is increased up to a certain point, which varies with different insects, but beyond which these same insects may be repelled. Therefore, a device having a circular or similarly shaped grid, and a light or lure of a certain intensity, will attract certain insects to the vicinity of the device, however will repel these same insects from entering within the field of the lure and grid, and thus these last-mentioned insects will encircle or hover around the lure and grid and escape. By employing a flat type grid and a light or lure of an intensity comparable with the area of the grid, the disadvantage of a round or similarly shaped grid is eliminated, as a flat grid of the same area as the round or similarly shaped grid will cover a much wider range, or greater diameter, of light or lure intensity, than the former, without any increase in material over a round grid of a certain diameter. Since it is a well established fact that the number or rate at which insects are exterminated increases with the size of the electrocuting grid with the same amount of light, it is believed evident that a device constructed in accordance with this invention materially increases the effectiveness of devices of this character.

The structure illustrated involves the use of an ordinary flat grid, generally designated 10, and a lure or lamp and lamp support, generally designated 11. The grid employed is comprised of sets of positive and negative electrocuting elements 12 and 13, which in the present instance is comprised of individual electrocuting bars 15—15, respectively connected to supports 16 and 17 through the agency of sleevelike connectors. These supports are arranged in pairs and have one end rigidly attached to an insulator such as 18, which serves to connect a pair of the supports with each other, thereby producing a self-sustaining or rigid unit comprised of said supports, insulators and electrocuting elements, all of which is shown, described and claimed in the application of Arthur J. Ferguson, Serial No. 42,601, filed September 28, 1935. These insulators 18 are in turn secured to the frame element 19, which thus, in the structure herein shown, causes the supports such as 16 and 17, and the electrocuting elements of the grid, to be suspended from the frame element 19. This frame element 19 also provides a support for the lure, generally designated 11, which is located at one side of the plane of the grid and preferably in spaced relation to the grid to allow insects to travel between the lure and grid. This last mentioned device is connected with the frame element 19, through the medium of a hollow bracket 20, one end of which is secured to the frame element, the opposite end being provided with a lamp socket 21 for the reception of the lamp 22. The frame member has an opening 23, through which conductors such as 24—25 pass from the transformer 26 into the tubular bracket 20 and to the lamp socket. It may be here stated that conductors 27 and 28 lead from the transformer 26 and may connect either with the individual supports 16 and 17, or with certain of the several electrocuting elements 12 and 13 of each set.

The bracket 20 is preferably of a length sufficient to position the lure at approximately the center of the area of the grid and is, in this particular instance, fashioned to locate the lure or lamp in spaced relation at one side of the plane of the grid. By arranging the lure or lamp at the approximate center of the grid, the most effective intensity of the light rays emanating from the lamp are more or less concentrated within the area of the grid, which thus causes night-flying insects to be enticed into effective relation with the area of the grid. As is generally known, night-flying insects are attracted by light, and as they approach the light, they are attracted to the light or travel about the light in certain more or less defined and sometimes irregular orbits. By arranging the lure or light in spaced relation to the grid, insects attracted by the light will probably fly toward the lure or light and attempt to exercise their natural tendencies of flight to, or encircling of, the lure or light and define orbits of travel around the lure or light, and thus contact the grid. Since these orbits of travel vary greatly as to length and breadth, it is evident that should an insect travel away from the light, it will probably enter the plane of the grid and thus become electrocuted, and this is true whether this flight is in a generally horizontal, generally vertical, or intermediate plane.

By arranging the light or lure at one side of the grid, some insects are attracted and fly directly into the grid from either side of the grid, while others reaching the lure are concentrated at or near this point and any attempt to fly away from the light in the direction of the grid results in accomplishing their electrocution.

From the foregoing description, it is believed manifest that the invention lends itself to simplicity of construction and reduction in manufacturing and selling costs, since an ordinary screen of a substantially flat character, such as employed to screen doors and other openings, may, merely by the addition of a lure and its arrangement with respect to the screen in the manner described, provide a construction capable of inducing insects to exercise their normal tendency to fly toward the light and encircle the same and thus become electrocuted by flying toward the light into the grid or traveling in a direction away from the light.

Furthermore, by securing the supports such as 16 and 17 to the respective insulators 18, through the agency of a pin, rivets, bolts or bolts and nuts, brazing, welding or soldering said bolts and nuts, and other holding elements, to prevent separation of said holding means and employing the sleevelike connectors shown, to secure said supports 16 and 17 to the electrocuting elements, bars or rods, 12 and 13, or securing these last-mentioned together by welding, brazing or soldering, a self-sustaining, rigid, inseparable electrocuting device is produced, in which all of these elements are connected with each other in a unitary manner against relative displacement.

It is believed evident that by resorting to the use of a flat grid instead of a round or similarly shaped grid, that this results in a grid having a much greater or wider range and will, therefore, cover a much larger range of light intensity without any increase in the material used, resulting in the advantage of increasing the efficiency of devices of this character without a corresponding increase in cost of production.

Having thus described the invention, what I claim and desire to cover by Letters Patent is:

1. A device comprising a plurality of electric conductor bars disposed in a single plane, insulating means between the bars, sets of electrocuting elements in spaced relation connected to said bars and having free ends, said conductor bars being supported at their upper ends only and said electrocuting elements being disposed in a single plane and having their free exposed ends substantially unobstructed, a single horizontal support constituting the sole means to which the bars and insulating elements are connected, a light bracket secured to an intermediate portion of the longitudinal support and extending downwardly therefrom, and a light mounted on said bracket and located substantially medially of the plane area of the electrocuting elements.

2. A device comprising a plurality of electric conductor bars, insulating means between the bars, sets of electrocuting elements in spaced relation connected to said bars having free terminals, said conductor bars being supported at their upper ends only and said electrocuting elements having free exposed ends, said bars and elements constituting a planar construction, a single horizontal support constituting the sole means to which the bars and insulating elements are connected, a light bracket secured to an intermediate portion of the longitudinal support and extending downwardly therefrom, and a light mounted on said bracket, said light being substantially in a zone central of the sets of electrocuting elements, and said support and said bracket construction forming a conduit for the passage of electrocuting wires to said light.

EDWARD A. LINDSLEY.